Jan. 10, 1967     D. E. RUCH     3,297,936

CONVERTER CIRCUIT EMPLOYING PULSE WIDTH MODULATION

Filed April 19, 1963     3 Sheets-Sheet 1

INVENTOR.
David E. Ruch
BY Paul J. Ethington
ATTORNEY

United States Patent Office 3,297,936
Patented Jan. 10, 1967

3,297,936
CONVERTER CIRCUIT EMPLOYING PULSE WIDTH MODULATION
David E. Ruch, Playa Del Rey, Calif., assignor to General Motors Corporation, Detroit, Mich., a corporation of Delaware
Filed Apr. 19, 1963, Ser. No. 274,103
1 Claim. (Cl. 321—18)

This invention relates to waveform regulation and, more particularly, to such regulation as accomplished by a static D.C. to D.C. converter. The invention contemplates a converter which produces a constant frequency signal of square waveform, the average value of which may be regulated by modulating the duration of the waveform pulses. Accordingly, the invention provides compensation for changes in a non-regulated D.C. power input whereby the output signal is made independent of variations in the input signal.

In carrying out the invention, the average value of a uni-directional square wave output signal may be varied by controlling the phase difference between a plurality of input waves of similar form. This is accomplished by combining and rectifying input waveforms of predetermined character such that during the period of phase lag between the waves the regulated output assumes a minimum value and during the balance of the input wave period, the output assumes a maximum value. Upon application of the input waveforms to a combining means, the result is a square waveform having an average value which is related to the phase difference between the input forms. According to the present invention, this phase difference and, thus, the average value of the output signal may be regulated either manually or by a feedback technique. In the latter case the regulation may be controlled by an error signal resulting from the comparison of the output of the converter with a reference signal. This error signal is applied to a phase control circuit which is effective to phase shift one of the input waveforms with respect to another.

In a specific embodiment of the invention, two input waveforms are produced by suitable alternating square wave generators. These waveforms are combined by means of suitable inductor windings and rectified to produce an output signal. In addition, means are connected to one of the waveform generators which, by means of an input control signal, is effective to time shift the output of the one waveform generator with respect to the output of the other in the proper direction to either increase or decrease the converter output as required.

The invention in general, and the specific embodiment thereof, may be more completely understood by reference to the following specification which is to be taken with the accompanying drawings of which:

Figure 1:
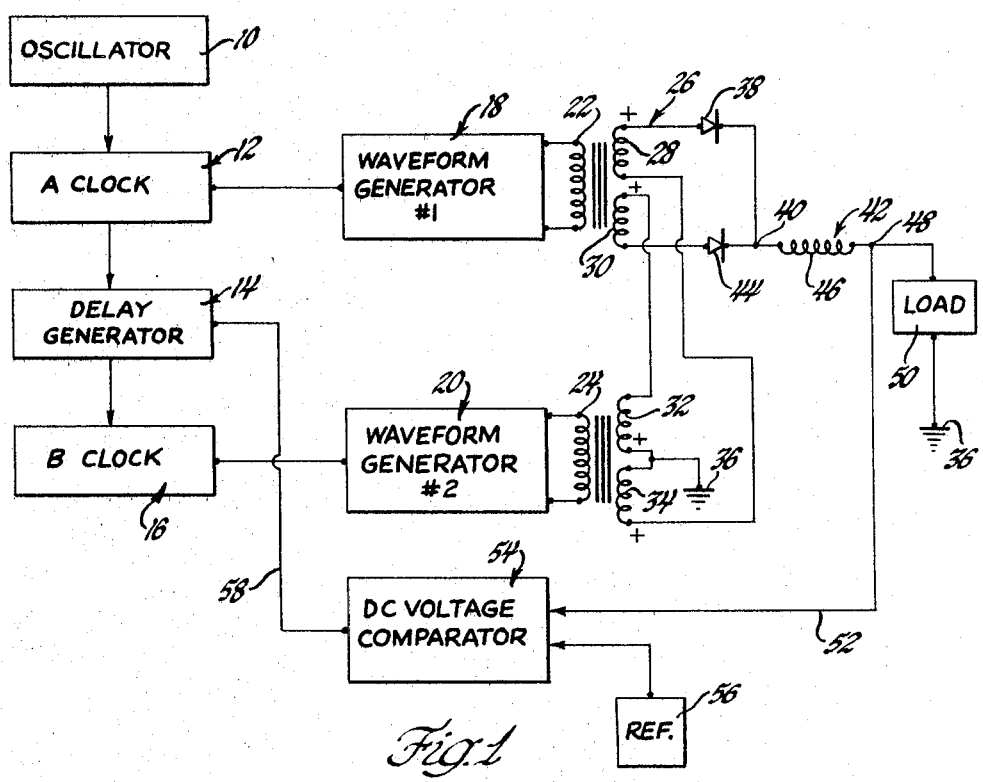
FIGURE 1 is a circuit diagram, partly in block form, of a specific embodiment of the invention.

Referring now to FIGURE 1, there is shown a source of base frequency signals in the form of an oscillator 10. This oscillator may be of any conventional form, such as a multivibrator or sine wave generator, and is adapted to produce output pulses at a definite frequency which is chosen with regard to such factors as effective filtering and transistor switching operation as will be seen in the following. The output of the oscillator 10 is connected to a clock 12 which is effective to produce output pulses at a frequency determined by the frequency of the oscillator 10. The output of the clock 12 is of a suitable form for application to subsequent circuitry and is connected through a delay generator 14 to a second clock 16, which is adapted to produce an output signal corresponding with that of clock 12, but which may be time shifted therefrom. It is to be noted that although the output of oscillator 10 is shown connected to clock 16 through clock 12 and delay generator 14, this particular connection is not critical to the invention. The object of this arrangement is to provide two sources of signals having equal frequencies but which may be phase shifted relative to one another.

Figure 2:
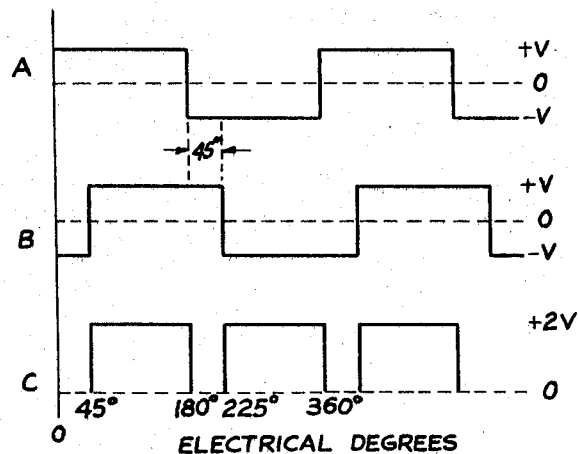
FIGURE 2 is a waveform chart to be considered in connection with FIGURE 1.

The base frequency signal output of clock 12 is connected to a first waveform generator 18. Similarly, the time base frequency signals from clock 16 are connected to a second waveform generator 20. The waveform generators 18 and 20 are similar in nature and are adapted to receive the base frequency signals from the clocks 12 and 16 and produce constant frequency alternating square waveforms as shown in FIGURE 2, lines A and B. It is to be understood that the term "square" as applied to signal waveforms contemplates any straight-sided, constant amplitude pulse, as for example, a rectangular pulse. These waveforms may appear across a pair of primary transformer coils 22 and 24 of the waveform generators 18 and 20 respectively.

Waveform combining means, generally indicated at 26, are provided to effectively add the square wave outputs of the generators 18 and 20. The means 26 comprises a pair of secondary coils 28 and 30 which are inductively linked to the primary coil 22, such that the voltage appearing across coil 22 appears across each of the secondary coils 28 and 30. The polarity of the secondary voltages is as indicated. Means 26 further includes a pair of secondary coils 32 and 34 inductively linked to the primary coil 24 of waveform generator 20. It will be noted that secondary coils 28 and 34 are connected such that voltages of the indicated polarity will add. Similarly, coils 30 and 32 are interconnected in series such that the voltages of the polarity indicated will also add. To form an output circuit, one side of the series combination of coils 28 and 34 is connected to a point of fixed potential indicated as ground 36. The series combination of coils 30 and 32 is also connected to ground 36. The other side of the combination of coils 34 and 28 is connected through a rectifier 38 to the input point 40 of a filter circuit generally designated at 42. Similarly, the other side of the combination of coils 30 and 32 is connected through a second rectifier 44 to the input point 40. The filter circuit 42, comprising an inductor or choke 46, has the output terminal 48 thereof connected to a load diagrammatically indicated at 50. As suggested in the drawing the other side of the load 50 may be connected to the ground point 36.

In the event feedback control is employed, a feedback circuit 52 connects the output point 48 to the first input of a D.C. voltage comparator 54. The second input of the D.C. voltage comparator 54 is connected to a voltage reference 56. The function of the comparator 54 is to compare the output signal appearing at terminal 48 with the reference 56 and to produce an error signal corresponding to the difference therebetween. Conductor 58 transmits the error signal from the comparator 54 to the input of the delay generator 14. The effect of the error signal from comparator 54 is to regulate the delay generator 14 so as to phase shift the output of clock 16 with respect to that of clock 12 in such a manner as to regulate the voltage across the load 50 in accordance with the standards set by the reference 56.

The operation of the invention may be briefly described with respect to the block diagram of FIGURE 1 and the waveform chart of FIGURE 2. As was previously stated, the clocks 12 and 16 supply signals of a predetermined frequency to the waveform generators 18 and 20. This predetermined frequency may be established by a setting of the oscillator 10. The waveform generators 18 and 20 are essentially of a push-pull nature and are responsive to the input from the clocks 12 and 16 respectively to produce across the primary coils 22 and 24 alternating square waveforms as indicated in FIGURE 2, lines A and B. By referring to FIGURE 2, lines A or B, it may be seen that the output wave is of square form having alternating and equal portions of positive and negative voltage values. The positive and negative amplitudes of the square waveforms are equal and constant and are designated +V and —V. The delay generator 14 is effective to delay the transmission of oscillator signals to the clock 16 in accordance with the magnitude of the error signal appearing on conductor 58. In FIGURE 2 it is assumed that the error signal output from the comparator 54 is effective to shift the square wave voltage appearing across coil 24 such that it lags the voltage across coil 22 by approximately 45°. Therefore, during the interval between 0° and 45° in FIGURE 2, the signal across coils 28 and 30 will be of the value and polarity indicated as +V. However, during this portion of the cycle, the voltage across coil 24 will be of a value corresponding to —V. By observing the proper polarity indications, it will be concluded that the addition of voltages across coils 30 and 32 produces a zero sum as does the addition of voltages across coils 28 and 34. Therefore, during the interval between 0° and 45° no output signal appears at terminal 40. This situation is indicated in FIGURE 2, line C, which is a waveform representative of the signal appearing at terminal 40.

Continuing with the observation of the results of combining waveforms 2A and 2B, it will be observed that during the interval between 45° and 180° both waveforms 2A and 2B are at a value corresponding with +V. Therefore, the sum of the voltages across the series combination of coils 28 and 34 is equal to +2V. Similarly, adding from point 36 to point 40, it is clear that the sum of the voltages across coils 32 and 30 is zero. Accordingly, rectifier 38 will be conductive to the positive voltage sum, and rectifier 44 prevents current flow through windings 30 and 32 to ground 36. From FIGURE 2C it will be observed that the signal appearing at terminal 40 corresponds with a value +2V in the interval between 45° and 180°.

Observing now the operation of the circuit of FIGURE 1 between the interval from 180° to 225° in FIGURE 2, voltage 2A appearing across coil 22 corresponds with the value of —V. However, due to the 45° lag in voltage 2B the signal across coil 24 is yet positive +V. Accordingly, a signal cancellation takes place between the coil pairs such that the output at signal 40 is zero. This is indicated in FIGURE 2C. A continued analysis indicates that during the period between 225° and 360° both voltage waveforms 2A and 2B are negative in value. Correspondingly, the voltage addition will result in a positive addition of voltages across coils 30 and 32 sufficient to render rectifier 44 conductive and present a signal having an amplitude +2V at terminal 40.

An analysis of the waveform of FIGURE 2 indicates that the period during which the output voltage of line C is at a zero value is determined by the relative phase difference between the voltages of lines A and B. Therefore, increasing the phase shift or lag of voltage 2B appearing across coil 24 is effective to increase the zero level portion of voltage 2C and decrease the +2V portion. That this will result will occur is clear from an inspection of the waveforms 2A and 2B which indicate that an increase in the phase difference between the two voltages will increase the time portion during which the cancellation between the waves is complete. Since the average value of the waveform of FIGURE 2C is determined by the percentage of the cycle over which the voltage is at a +2V value it follows that the average value of the converter output appearing at terminal 40 is proportional to the phase shift between the output waveforms of the generators 18 and 20.

Figure 3:
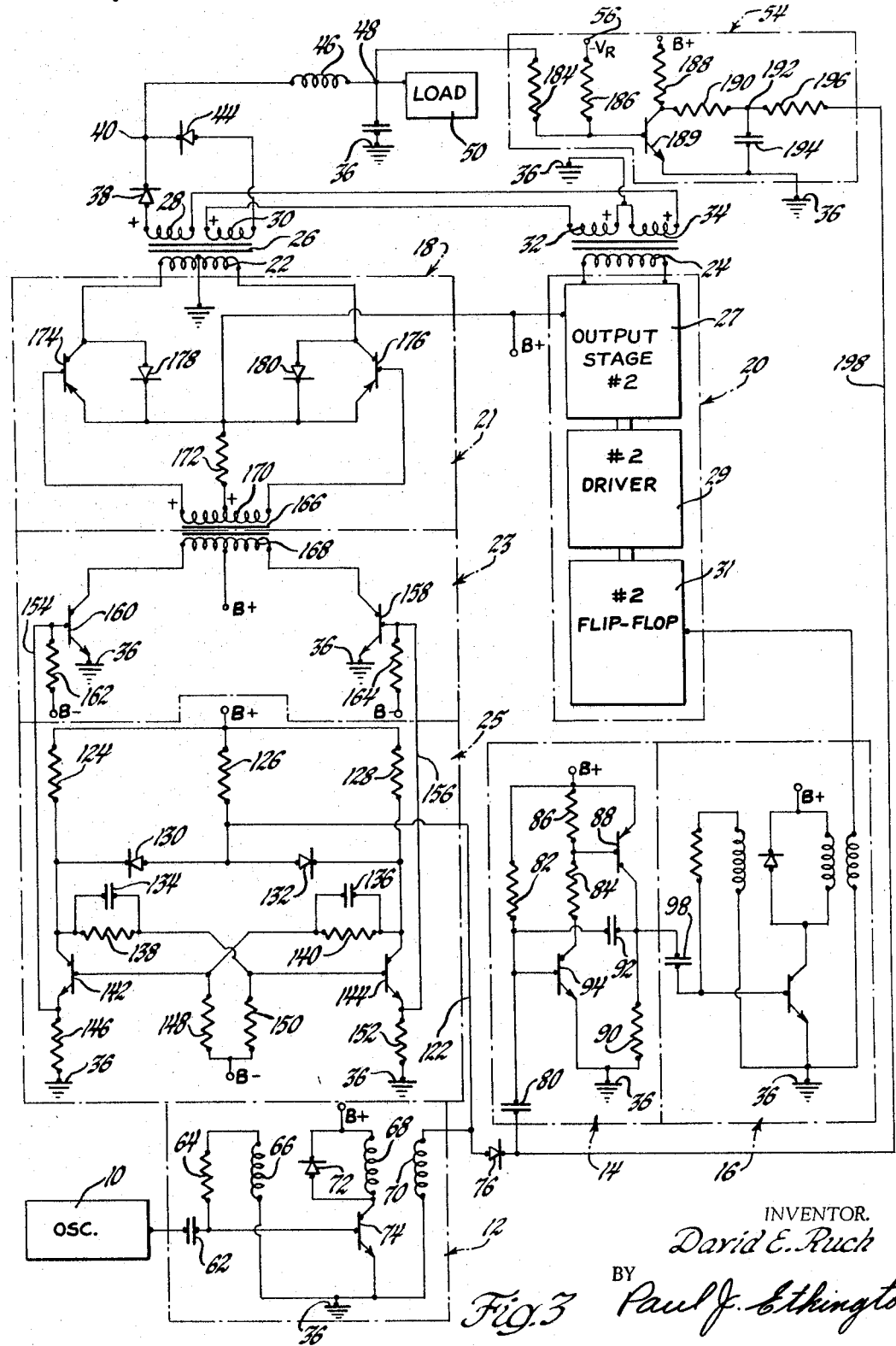
FIGURE 3 is a detailed schematic diagram of the specific embodiment.
Figure 4:
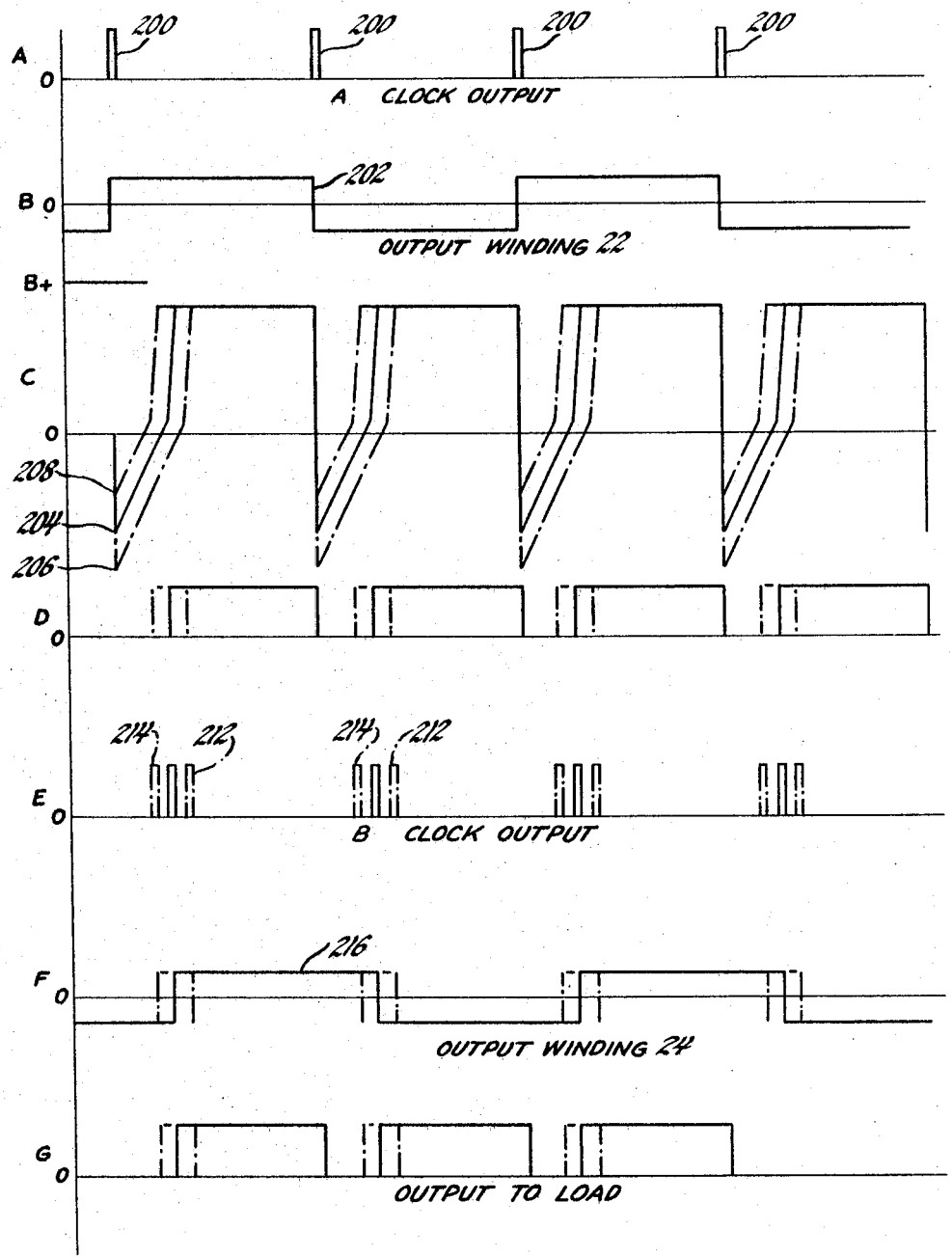
FIGURE 4 is a waveform chart to be considered in connection with FIGURE 3.

Referring now to FIGURES 3 and 4, a more detailed description of the invention will be given. The A clock 12 comprises an input capacitor 62 connecting the output of oscillator 10 to the base of an NPN transistor 74. The clock 12 further includes pulse transformer windings 66, 68 and 70, transformer reset diode 72 and bias resistor 64. The emitter of transistor 74 is grounded at 36 and the collector is connected to transformer winding 68 and also to the anode of diode 72. The cathode of diode 72 and the other side of winding 68 are tied to the supply voltage B+. One side of winding 66 is grounded at 36 and the other side is connected to the base of transistor 74 via resistor 64.

A positive going pulse from oscillator 10 forward biases the base-to emitter junction of transistor 74, thus allowing conduction to begin from B+, through winding 68, the collector-to-emitter junction and to ground 36. The expanding flux field in winding 68 induces increasing E.M.F.'s in windings 66 and 70, thus increasing potential on winding 66 and further raising the forward base-to-emitter bias of transistor 74 across resistor 64. In this manner, the switching of transistor 74 toward saturation continues regeneratively until the core of winding 68 saturates. At this point increasing potentials are no longer induced in winding 66 by winding 68 with the result that the flux field in winding 68 begins to fall to induce an E.M.F. in winding 66 opposite to the original E.M.F. The forward bias on the base of transistor 74 is accordingly quickly reversed regeneratively until cut-off is completed. After cut-off, a discharge path through diode 72 permits winding 68 to continue to reset and windings 66 and 70 reset using the paths to ground 36. In this manner a narrow but strong positive pulse 200 (FIGURE 4A) is produced on conductor 122 going to flip-flop 25 for every cycle of the oscillating input. The flip-flop 25 is part of the waveform generator 18 shown in block in FIGURE 1. Since the arrangement of components and the operation of clock 16 are similar to clock 12 with the exception of the input source, the description of that clock is omitted for the sake of simplicity. It need be realized only that the clock 16 input signal comes from delay generator 14, the arrangement and operation of which are described below.

Flip-flop 25 of waveform generator 18 consists of input conductor 122, steering diodes 130 and 132, resistors 124, 126, 128, 138, 140, 146, 148, 150 and 152, capacitors 134 and 136, NPN transistors 142 and 144, and output conductors 154 and 156. Input conductor 122 is connected to B+ across resistor 126 and to the anodes of diodes 130 and 132. The cathode of diode 130 is connected to B+ across resistor 124 to the collector of transistor 142, and to the base of transistor 144 across a parallel circuit including capacitor 134 and resistor 138. Similarly, the cathode of diode 132 is connected to the collector of transistor 144, to B+ across resistor 128, and to the base of transistor 142 across a parallel circuit consisting of capacitor 136 and resistor 140. The bases of transistors 142 and 144 are connected to the negative supply B— across resistors 148 and 150 respectively. The emitter of transistor 142 is connected to ground 36 across resistor 146 and to a driver 23 via flip-flop output conductor 154. Similarly, the emitter of transistor 144 is connected to ground 36 across resistor 152 and to driver 23 via flip-flop output conductor 156.

Starting with transistor 142 saturated and 144 cut off, the potential at the collector of transistor 142 is near ground, while the potential at the collector of transistor 144 is B+. Since the near ground potential at the collector of transistor 142 is applied to the base of transistor 144 via resistor 138, transistor 144 is kept cut off. Similarly, the B+ potential at the collector of 144 is applied to the base of transistor 142 via resistor 140 and, thus, transistor 142 is kept in saturation. Also in this initial state, the potential at the emitter of transistor 144 is ground while the potential at the emitter of transistor 142 is of some value determined by the drop across resistor 146 and the base emitter drop of transistor 160.

When a positive pulse 200, from clock 12, is steered by diodes 130 and 132 to the collectors of transistors 142 and 144, the pulse at the collectors of transistor 142 and 144 increases the collector potential of both transistors. The duration of clock pulse 200 is short compared to the time constants associated with capacitors 134 and 136. At the end of the pulse 200, the flip-flop 25 changes state because of the different charges on the capacitors 134 and 136. Accordingly, transistor 142 begins to cut off and transistor 144 begins to conduct from B+ across resistor 128, through the collector-to-emitter junction, across resistor 152, to ground 36. With the potential at the collector thereof lowered, the forward base-to-emitter bias on transistor 142 is in turn lowered so that transistor 142 continues to cut off with an accompanying increasing potential at its collector. In this manner the switching process continues regeneratively due to the rising potential at the collector of transistor 142 connected to the base of transistor 144 via resistor 138. The effect of one pulse from clock 12 is, thus, seen to be the complementary switching of transistors 142 and 144 in flip-flop 25. And with such switching it is obvious that the potentials on the emitters of transistors 142 and 144, and therefore, the potentials on output conductors 154 and 156 are also switched in a complementary fashion. The potential on output conductor 154 is thereby switched to a positive value when transistor 142 is on and the potential on conductor 156 is switched to zero when transistor 144 is off.

Waveform generator 20 as shown in FIGURE 3 includes an arrangement of components comprising a flip-flop 31, driver 29 and an output stage 27. As previously stated, generators 18 and 20 are substantially equivalent and the description of the former is omitted for the sake of simplicity. Although not shown in the figures, means may be provided to synchronize the phase of flip-flop 25 with flip-flop 31 such that when the circuit is initially activated, the proper sides of the flip-flops will conduct initially to thus prevent an undesirable phase cancellation between the outputs of waveform generators 18 and 20.

The outputs of flip-flop 25 of waveform generator 18, as they appear on the emitter of transistors 142 and 144, are applied to the driver stage 23 by conductors 154 and 156. This driver stage consists of NPN transistors 158 and 160, biasing resistors 162 and 164, and output primary winding 168 of transformer 166. Assuming that transistor 160 initially is on and transistor 158 is off to correspond with the initial state of flip-flop 25, the potential at the base electrode of transistor 160 is positive and that on the base electrode of transistor 158 is ground. Accordingly, the forward base-to-emitter bias on transistor 160 allows the conduction of current from B+, through primary winding 168, through the collector-to-emitter junction of transistor 158 to ground 36. Thus, it is seen that the switching of states in flip-flop 25 causes transistors 158 and 160 to switch in complementary fashion. The arrangement of components and operation of driver 29 of waveform generator 20 are similar to that of driver 23 and therefore, are not described.

Following driver circuit 23 is an output stage 21 consisting of PNP transistors 174 and 176, a secondary winding 170 which is coupled to primary winding 168 of driver transformer 166, primary winding 22 of output transformer 26 and resistor 172. One end of driver secondary winding 170 is connected to the base electrode of transistor 174 and the other end is connected to the base of transistor 176. The center tap of winding 170 is connected to B+ across resistor 172 and the emitters of transistors 174 and 176 are also connected in common to B+. One end of output primary winding 22 is connected to the collector of transistor 174. The other end of winding 22 is connected to the collector of transistor 176. The center tap of winding 22 is connected to ground 36.

Assuming that transistor 176 is initially on and transistor 174 is off, to correspond with the above-described initial states of driver stage 23 and in turn flip-flop 25, the potential appearing on winding 170 will be of the indicated polarities. Also the positive potential on the base of transistor 174 is sufficiently high to keep transistor 174 off, while the potential on the base of transistor 176 is sufficiently negative to keep transistor 176 in saturated conduction. Accordingly, transistor 176 conducts from B+ through the emitter-to-collector junction of transistor 176, from right to left through the right half of winding 22, to ground 36.

When the input to output stage 21 is switched by the switching of flip-flop stage 25 and in turn, driver stage 23, the polarity appearing across secondary winding 170 of transformer 166 is the opposite to the indicated polarities. This raises the potential on the base of transistor 176 to cut off and lowers the potential on transistor 174 to allow it to saturate. Thereupon, the potential on the collector of transistor 174 and at the left end of winding 22 becomes B+ while the potential at the right end of winding 22 is equal in magnitude, but opposite in polarity to that of the left end.

Thus, as also may be seen in FIGURES 4A and 4B, each clock pulse 200 from the clock 12 on conductor 122 to waveform generator 25 switches the potential appearing across output winding 26, with such potential alternating above and below ground. This potential swing produces waveform 202. Similarly, a potential swing across output winding 24 produces the alternating square waveform 216 of FIGURE 4F.

The potentials across windings 28, 30, 32, and 34 are added as previously described, and the sum after being filtered at 46, is applied to the load 50 at point 48. This point is also connected to voltage comparator 54, which consists of resistors 184, 186, 188, 190, and 196, NPN transistor 189, negative reference potential 56 and capacitor 194. Resistor 184 is connected in series between the load 50 and the base of transistor 189. Resistor 186 is also connected to the base of transistor 189 but from negative reference 56. The collector of transistor 189 is connected to resistor 188, the other side of which is connected to B+, and to conductor 198 across resistors 190 and 196. Point 192 between resistor 190 and 196 is connected to ground 36 across capacitor 194. Also the emitter of transistor 189 is grounded to 36.

The voltage comparator 54 produces an increase in potential on conductor 198 when the load voltage is less than desired, or conversely, a decrease in the potential when the load voltage is greater than desired. The load voltage appearing at point 48, after being attenuated across resistor 184, is summed with the negative reference potential 56 after it is attenuated by resistor 186. If the voltage at the base of transistor 189 is as required by reference potential 56, the resulting base-to-emitter bias is sufficient to maintain conduction through transistor 189 at a point between saturation and cut off. However, when the output becomes larger, the bias on the base of transistor 189 becomes more positive, thus, causing greater conduction from B+ across resistor 188, the colector-to-base junction of transistor 189, to ground 36. With increased conduction, the drop across resistor 188 increases so that the potential at the collector of transistor 189 decreases. Accordingly, the potential appearing at point 192, which is the input or control point for the delay generator 14, decreases. This voltage decrease is transmitted to the base of transistor 94 via conductor 198.

It is thus apparent that changes in the load voltage above and below a desired value cause corresponding decreases and increases, respectively, in the potential appearing at the input point 192. It is shown below that these changes, in turn, effect a delay of the output pulse of clock 16 with respect to the output pulse of clock 12 such that the load voltage is returned to the desired value.

Delay generator 14 consists of input capacitor 80 and feedback capacitor 92, NPN transistor 94 and PNP transistor 88, and resistors 82, 84, 86, and 90. Conductor 198 from voltage comparator 54 is connected to the base of transistor 94 via capacitor 80. Also B+ is connected to the base of transistor 94 across resistor 82 and to the emitter of transistor 88. Capacitor 92 connects the base of 94 to the collector of 88. The emitter of transistor 94 is grounded at 36 as is the collector of transistor 88 via resistor 90. The base of transistor 88 is connected both to B+ via resistor 86 and to the collector of transistor 94 via resistor 84. The output of the circuit is taken at the collector of transistor 88.

Shortly before the pulse 200 from the A clock 12, transistors 94 and 88 both conduct. The transistor 94 is sufficiently forward biased due to the attenuated B+ on its base, and conducts from B+, through the base-emitter junction of transistor 88, through resistor 84, transistor 94 to ground 36. The potential on the base of transistor 88 is essentially at B+ with the effect that transistor 88 is saturated and the collector potential is essentially B+. After a pulse from the A clock 12 is conducted to capacitor 80 via diode 76, capacitor 80 is charged via the base-to-emitter junction of transistor 94 to ground 36 so that a negative potential appears on the base of transistor 94. This reverse biases the base-to-emitter junction of transistor 94 to cut that transistor off. The potential at the collector of transistor 94 goes toward B+ with the result that the base-to-emitter junction of transistor 88 is also reverse biased to cut-off and so that the potential at the collector of transistor 88, in turn, drops to ground 36. The waveform of the voltage appearing at the base of transistor 94 of delay generator 14 is shown in FIGURE 4C. At the conclusion of the clock pulse 200, this potential drops to a negative potential 204 which is equivalent to the difference between the potential at input point 192 and the potential across capacitor 80. The base potential exponentially increases toward B+ until it reaches the potential at which the base-emitter junction of transistor 94 is forward biased. This causes transistor 94 to conduct, thus causing transistor 88 to conduct. The potential on the collector of transistor 88 increases from ground as shown in FIGURE 4D. This rising potential on the collector of transistor 88 is fed back to the base of transistor 94 via capacitor 92 and thereby causes the switching transition to be accomplished rapidly in a regenerative fashion. The rising potential on the collector of transistor 88 is also fed via capacitor 98 to the B clock circuit 16, which operates in the same manner as the A clock 12 previously described. The result is, therefore, that the B clock 16 produces a delayed pulse 212 for each pulse 200 from the A clock 12.

The length of the delay is controlled by the potential produced on conductor 198 by voltage comparator 54. This positive potential serves to reduce the amount that the capacitor 80 must discharge before the threshold bias of transistor 94 is attained. As indicated above, the potential at which the base of transistor 94 begins the exponential rise toward the turn-on threshold point is controlled by the potential at point 192. Point 206 of FIGURE 4C corresponds with the condition of the load voltage being greater than the desired reference signal. Conversely, point 208 corresponds with the condition of load voltage being less than desired, thus requiring a longer period of conduction of transistor 94 and 88. As may be seen from the phantom lines in FIGURES 4C, D, E, and F, when the load voltage is low, the potential on the collector of transistor 88 goes up earlier than the pulse 214 from the B clock and, in turn, the output across winding 24, develop earlier. The final result, as shown in FIGURE 4G, is that the output to the load 40 is positive a greater portion of the cycle. Similarly the waveforms of FIGURE 4 show that, when the load voltage 48 is greater than desired, the potential at the base of transistor 94 takes longer to attain its threshold value so that the potential on the collector of transistor 88 goes up later. The B clock output and its related output from winding 24 then, in turn, also occurs later in time. The resulting output wave to the load 40 thereupon occupies a smaller portion of the cycle.

While the invention has been described with reference to a particular embodiment thereof, it is to be understood that various modifications and substitutions may be made without departing from the spirit of the invention as defined by the following claim.

What is claimed is:

A converter circuit for supplying a regulated unidirectional voltage to a load comprising: a source of timing signals, first flip-flop means connected to receive the timing signals for producing a first bipolar rectangular voltage related in frequency to the timing signals, voltage controlled delay means, second flip-flop means connected through the delay means to receive the timing signals for producing a second bipolar rectangular voltage of the same frequency as the first bipolar voltage and comparable in amplitude thereto, transformer means for receiving and adding the first and second rectangular voltages, a load, full wave rectifier means connecting the transformer means to the load to provide said load with a undirectional output voltage pulse train of constant frequency and uniform pulse amplitude, feedback means including a voltage reference, comparator means for comparing the average value of the output voltage with the reference and producing a control voltage related to the difference therebetween, and means connecting the control voltage the voltage controlled delay means for varying the phase between the first and second rectangular voltages thereby to vary the width of the pulses in said train.

References Cited by the Examiner

UNITED STATES PATENTS

| | | | |
|---|---|---|---|
| 2,968,738 | 1/1961 | Pintell | 321—2 |
| 3,010,062 | 11/1961 | Van Emden | 321—45 |
| 3,117,270 | 1/1964 | Tailleur | 321—2 |
| 3,205,424 | 9/1965 | Bates | 321—18 |

JOHN F. COUCH, *Primary Examiner.*

W. H. BEHA, *Assistant Examiner.*